United States Patent
Dullien et al.

(10) Patent No.: US 11,604,718 B1
(45) Date of Patent: Mar. 14, 2023

(54) PROFILING BY UNWINDING STACKS FROM KERNEL SPACE USING EXCEPTION HANDLING DATA

(71) Applicant: optimyze.cloud Inc., Seattle, WA (US)

(72) Inventors: Thomas Dullien, Zurich (CH); Sean Heelan, Oxford (GB)

(73) Assignee: elasticsearch B.V., Amsterdam (NL)

( * ) Notice: Subject to any disclaimer, the term of this patent is extended or adjusted under 35 U.S.C. 154(b) by 0 days.

(21) Appl. No.: 17/192,803

(22) Filed: Mar. 4, 2021

Related U.S. Application Data

(60) Provisional application No. 62/984,946, filed on Mar. 4, 2020, provisional application No. 62/984,987, filed on Mar. 4, 2020.

(51) Int. Cl.
 *G06F 11/36* (2006.01)

(52) U.S. Cl.
 CPC .............................. *G06F 11/3604* (2013.01)

(58) Field of Classification Search
 None
 See application file for complete search history.

(56) References Cited

U.S. PATENT DOCUMENTS

| | | | |
|---|---|---|---|
| 6,126,328 A | 10/2000 | Mallory et al. | |
| 8,229,726 B1 | 7/2012 | Magdon-Ismail et al. | |
| 2003/0182655 A1 | 9/2003 | Hundt et al. | |
| 2004/0163077 A1 | 8/2004 | Dimpsey et al. | |
| 2006/0037003 A1 | 2/2006 | Long et al. | |
| 2009/0055813 A1 | 2/2009 | Haber et al. | |
| 2015/0347271 A1* | 12/2015 | Payne | G06F 11/3636 717/128 |
| 2015/0370560 A1 | 12/2015 | Tan et al. | |
| 2019/0007493 A1 | 1/2019 | Gray et al. | |
| 2019/0108036 A1* | 4/2019 | Texeira | G06F 9/455 |
| 2020/0218553 A1* | 7/2020 | D'Souza | G06F 11/0712 |

OTHER PUBLICATIONS

Frederickson, Ben "Profiling Native Python Extensions", Sep. 27, 2019, pp. 1-4.
"GDB Utilities for HHVM", Jun. 23, 2021.
Bastian, Theophile et al., "Reliable and Fast DWARF-Based Stack Unwinding", Proceedings of the ACM on Programming Languages, ACM, 2019, pp. 1-25.
Nardelli, Francesco "Tales from Binary Formats", Jan. 26, 2018, pp. 1-133.
"[Patch 7/7] DWARF: add the config option", Jun. 23, 2021.
Talbot, David et al., "Bloom maps", Oct. 29, 2018, pp. 1-15.
Porat, Ely "An Optimal Bloom Filter Replacement Based on Matrix Solving", Apr. 11, 2008, pp. 1-13.
Putze, Felix et al., "Cache-, Hash- and Space-Efficient Bloom Filters", 2007, pp. 1-14.

* cited by examiner

*Primary Examiner* — Lewis A Bullock, Jr.
*Assistant Examiner* — Mark A Gooray
(74) *Attorney, Agent, or Firm* — Raubvogel Law Office

(57) ABSTRACT

Functionality is provided for profiling code by unwinding stacks in frame-pointer omitted executables using C++ exception stack unwinding information. Information is extracted from executable files, and used to optimize stack unwinding operations. In at least one embodiment, the system uses information that has been included for exception handling. Storage of such information can be optimized by exploiting patterns in stack deltas.

15 Claims, 7 Drawing Sheets

US 11,604,718 B1

PROFILING BY UNWINDING STACKS FROM KERNEL SPACE USING EXCEPTION HANDLING DATA

CROSS-REFERENCE TO RELATED APPLICATIONS

The present application claims the benefit of U.S. Provisional Application Ser. No. 62/984,987 for "Profiling by Unwinding Stacks from Kernel Space Using Exception Handling Data", filed on Mar. 4, 2020, which is incorporated by reference herein in its entirety.

The present application claims the benefit of U.S. Provisional Application Ser. No. 62/984,946 for "Unwinding Program Call Stacks for Performance Profiling", filed on Mar. 4, 2020, which is incorporated by reference herein in its entirety.

The present application is related to U.S. Utility application Ser. No. 17/192,765 for "Unwinding Program Call Stacks for Performance Profiling", filed on Mar. 4, 2021, which is incorporated by reference herein in its entirety.

TECHNICAL FIELD

The present document relates to software performance analysis techniques, including performance profiling.

BACKGROUND

One technique in software performance analysis is sampling profiling, usually done by sampling profilers. Such programs stop the program under examination at regular intervals, and inspect the call stack of the program, which is typically a stack of all function invocations in a particular programming language. The data from the call stack is then post-processed to show the programmer how much time is spent executing various portions of the code, such as in each function or sequence of function invocations.

Conventional sampling profilers generally unwind native machine-level stacks via a particular compiler convention called "frame pointers." In recent years, compilers have increasingly begun optimizing frame pointers to improve code performance, making profiling and performance measurement more difficult.

As a result, conventional performance measurement usually works in one of the following ways.

One option is to require developers to compile all code with a frame pointer (for example by enabling a compiler flag that says "no frame pointer omission"). The frame pointer can then be used to perform the unwinding. This makes all code slower.

Another option is to read debug information, which may include special information emitted by the compiler, during the stack unwinding process in order to determine how to unwind stack frames for executables that have been compiled without frame pointers. This approach requires debug information to be available, which may not be the case on production systems. Furthermore, the format of the debug information may be complex, making it difficult to use such information from an operating system kernel-based process. In practice, many real-world profilers dump a section of the entire stack, and then post-process this section in user mode (and with access to the debug information) to recover fractions of the real stack traces. Again, such an approach can slow down the process considerably.

SUMMARY

In various embodiments, the system and method described herein provide functionality for profiling code by unwinding (i.e., constructing) stacks in executables that may lack frame pointers, using C++ exception stack unwinding information.

In at least one embodiment, the described system exploits a features of modern Linux systems that allows programmers to execute functionally limited, controllable pieces of code at the kernel level via a mechanism called extended Berkeley Packet Filter code (eBPF code). Once eBPF code has been validated and loaded into the kernel, it can be used to perform various tasks, such as filtering network packets or gathering statistics about operating system usage.

In at least one embodiment, the described system analyzes modern optimized executable files (such as Linux files) that may lack frame pointers, and extracts information as to how to unwind (i.e., construct) stacks from such executables. In at least one embodiment, the system uses information that has been included for C++ exception handling. This data is then transmitted to code that is running in kernel space, such as in the form of extended Berkeley Filter (eBPF) code. The code in the kernel runs at regular intervals and uses the extracted information to unwind stack traces.

In at least one embodiment, the described system uses unwinding information from debug symbols (when available), or unwinding information from the C++ stack that is normally used for exception handling, and post-processes such information into a more compact form to be loaded into the kernel. It then uses eBPF to process this information to allow unwinding of native stacks for frame-pointer omitted executables from the kernel at regular intervals.

In summary, the described system performs the following steps:

Extract information intended for C++ stack unwinding for exception handling from frame-pointer omitted executables for which no debug information is available.

Process the extracted information so that it can be stored in compact form.

Load this compact form into kernel space to be accessible by eBPF programs.

Run a sampling profiler in kernel space at regular intervals, to unwind the native stacks by using the compact form of the extracted information.

By performing the above steps, the described system is able to perform profiling on fully optimized executable code, so that developers do not have to trade off execution speed for the ability to unwind and profile code. Furthermore, the described system avoids the need to dump entire sections of the stack to be post-processed by user space code.

Further details and variations are described herein.

BRIEF DESCRIPTION OF THE DRAWINGS

The accompanying drawings, together with the description provided below, illustrate several embodiments. One skilled in the art will recognize that the particular embodiments illustrated in the drawings and described herein are merely exemplary, and are not intended to limit scope.

DETAILED DESCRIPTION OF THE EMBODIMENTS

Figure 1:
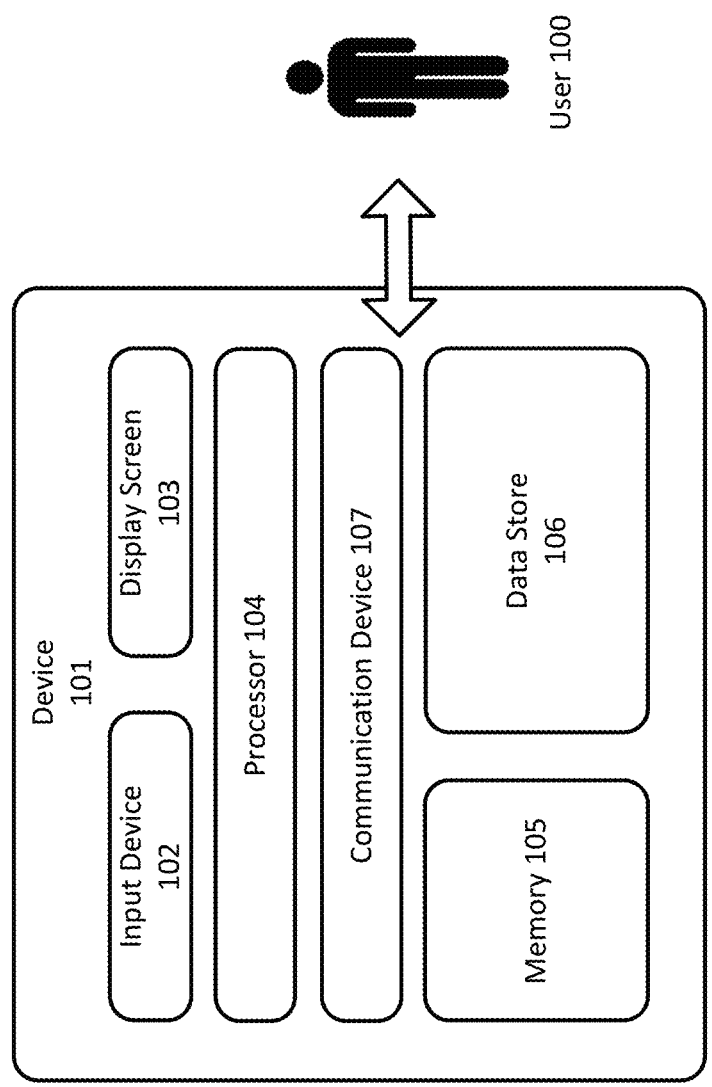
FIG. 1 is a block diagram depicting a hardware architecture for implementing the techniques described herein according to one embodiment.

In various embodiments, the techniques described herein can be applied in the context of a sampling profiler for unwinding and analyzing executable code stacks. Although the techniques are described herein in terms of a sampling profiler, one skilled in the art will recognize that such techniques can also be applied to other contexts.

One skilled in the art will further recognize that the techniques described herein can be implemented in a stand-alone device, client/server architecture, distributed network environment, and/or any other suitable architecture.

In some embodiments, one or more components, as shown and described below in connection with FIGS. 1 and 2, may be used to implement the system and method described herein. Such components may be implemented in a cloud computing-based client/server architecture, using, for example, Amazon Web Services, an on-demand cloud computing platform available from Amazon.com, Inc. of Seattle, Wash. For illustrative purposes, the system and method are described herein in the context of such an architecture. One skilled in the art will recognize, however, that the system and method can be implemented using other architectures, such as for example a stand-alone computing device rather than a client/server architecture.

Further, the functions and/or method steps set forth below may be carried out by software running on one or more of device 101, client device(s) 108, server 110, and/or other components. This software may optionally be multi-function software that is used to retrieve, store, manipulate, and/or otherwise use data stored in data storage devices such as data store 106, and/or to carry out one or more other functions.

For purposes of the description herein, a "user", such as user 100 referenced herein, is an individual, enterprise, or other group, which may optionally include one or more users. A "data store", such as data store 106 referenced herein, is any device capable of digital data storage, including any known hardware for nonvolatile and/or volatile data storage. A collection of data stores 106 may form a "data storage system" that can be accessed by multiple users. A "computing device", such as device 101 and/or client device(s) 108, is any device capable of digital data processing. A "server", such as server 110, is a computing device that provides data storage, either via a local data store, or via connection to a remote data store. A "client device", such as client device 108, is an electronic device that communicates with a server, provides output to user 100, and accepts input from user 100.

System Architecture

According to various embodiments, the system and method can be implemented on any electronic device or set of interconnected electronic devices, each equipped to receive, store, retrieve, and/or present information. Each electronic device may be, for example, a server, desktop computer, laptop computer, smartphone, tablet computer, and/or the like. As described herein, some devices used in connection with the system described herein are designated as client devices, which are generally operated by end users. Other devices are designated as servers, which generally conduct back-end operations and communicate with client devices (and/or with other servers) via a communications network such as the Internet. In at least one embodiment, the methods described herein can be implemented in a cloud computing environment using techniques that are known to those of skill in the art.

In addition, one skilled in the art will recognize that the techniques described herein can be implemented in other contexts, and indeed in any suitable device, set of devices, or system capable of interfacing with existing enterprise data storage systems. Accordingly, the following description is intended to illustrate various embodiments by way of example, rather than to limit scope.

Referring now to FIG. 1, there is shown a block diagram depicting a hardware architecture for practicing the described system, according to one embodiment. Such an architecture can be used, for example, for implementing the techniques of the system in a computer or other device 101. Device 101 may be any electronic device.

In at least one embodiment, device 101 includes a number of hardware components well-known to those skilled in the art. Input device 102 can be any element that receives input from user 100, including, for example, a keyboard, mouse, stylus, touch-sensitive screen (touchscreen), touchpad, trackball, accelerometer, microphone, or the like. Input can be provided via any suitable mode, including for example, one or more of: pointing, tapping, typing, dragging, and/or speech. In at least one embodiment, input device 102 can be omitted or functionally combined with one or more other components.

Data store 106 can be any magnetic, optical, or electronic storage device for data in digital form; examples include flash memory, magnetic hard drive, CD-ROM, DVD-ROM, or the like. In at least one embodiment, data store 106 stores information that can be utilized and/or displayed according to the techniques described below. Data store 106 may be implemented in a database or using any other suitable arrangement. In another embodiment, data store 106 can be stored elsewhere, and data from data store 106 can be retrieved by device 101 when needed for processing and/or presentation to user 100. Data store 106 may store one or more data sets, which may be used for a variety of purposes and may include a wide variety of files, metadata, and/or other data.

In at least one embodiment, data store 106 may store data related to native code, interpreted code, call stacks, and/or any other information that may be used in performing the methods described herein. In at least one embodiment, such data can be stored at another location, remote from device 101, and device 101 can access such data over a network, via any suitable communications protocol.

In at least one embodiment, data store 106 may be organized in a file system, using well known storage architectures and data structures, such as relational databases. Examples include Oracle, MySQL, and PostgreSQL. Appropriate indexing can be provided to associate data elements in data store 106 with each other. In at least one embodiment, data store 106 may be implemented using cloud-based storage architectures such as NetApp (available from NetApp, Inc. of Sunnyvale, Calif.), Amazon S3 (available from Amazon, Inc. of Seattle, Wash.), and/or Google Drive (available from Google, Inc. of Mountain View, Calif.).

Data store 106 can be local or remote with respect to the other components of device 101. In at least one embodiment, device 101 is configured to retrieve data from a remote data storage device when needed. Such communication between device 101 and other components can take place wirelessly, by Ethernet connection, via a computing network such as the Internet, via a cellular network, or by any other appropriate communication systems.

In at least one embodiment, data store 106 is detachable in the form of a CD-ROM, DVD, flash drive, USB hard drive, or the like. Information can be entered from a source outside of device 101 into a data store 106 that is detachable, and later displayed after the data store 106 is connected to device 101. In another embodiment, data store 106 is fixed within device 101.

In at least one embodiment, data store 106 may be organized into one or more well-ordered data sets, with one or more data entries in each set. Data store 106, however, can have any suitable structure. Accordingly, the particular organization of data store 106 need not resemble the form in which information from data store 106 is displayed to user 100. In at least one embodiment, an identifying label is also stored along with each data entry, to be displayed along with each data entry.

Display screen 103 can be any element that displays information such as text and/or graphical elements. In particular, display screen 103 may display a user interface for presenting information regarding performance profiling including cross-language profiling reports, and/or for prompting user 100 to configure such reports. In at least one embodiment where only some of the desired output is presented at a time, a dynamic control, such as a scrolling mechanism, may be available via input device 102 to change which information is currently displayed, and/or to alter the manner in which the information is displayed.

Processor 104 can be a conventional microprocessor for performing operations on data under the direction of software, according to well-known techniques. Memory 105 can be random-access memory, having a structure and architecture as are known in the art, for use by processor 104 in the course of running software.

A communication device 107 may communicate with other computing devices through the use of any known wired and/or wireless protocol(s). For example, communication device 107 may be a network interface card ("NIC") capable of Ethernet communications and/or a wireless networking card capable of communicating wirelessly over any of the 802.11 standards. Communication device 107 may be capable of transmitting and/or receiving signals to transfer data and/or initiate various processes within and/or outside device 101.

Figure 2:
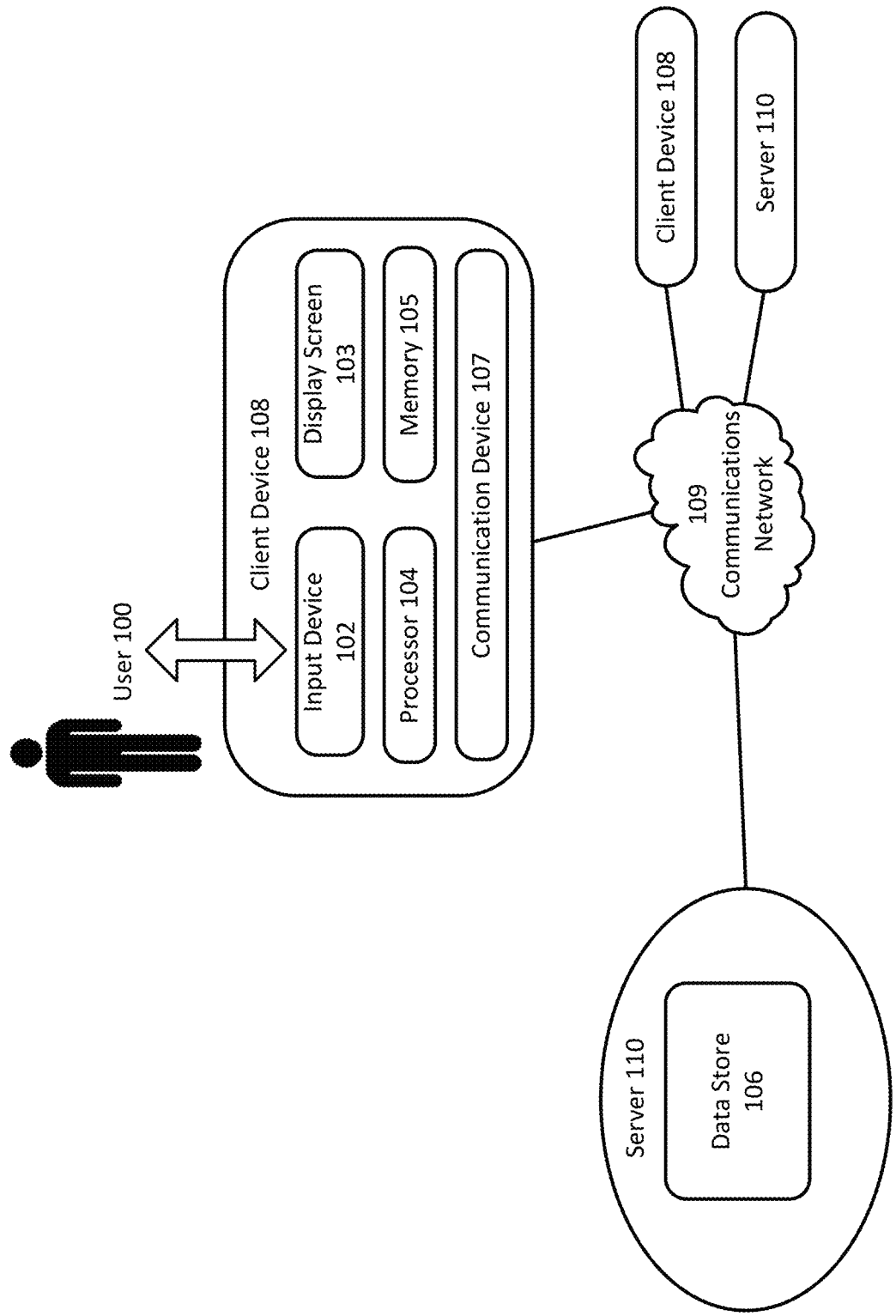
FIG. 2 is a block diagram depicting a hardware architecture for implementing the techniques described herein in a client/server environment, according to one embodiment.

Referring now to FIG. 2, there is shown a block diagram depicting a hardware architecture in a client/server environment, according to one embodiment. Such an implementation may use a "black box" approach, whereby data storage and processing are done completely independently from user input/output. An example of such a client/server environment is a web-based implementation, wherein client device 108 runs a browser that provides a user interface for interacting with web pages and/or other web-based resources from server 110. Items from data store 106 can be presented as part of such web pages and/or other web-based resources, using known protocols and languages such as Hypertext Markup Language (HTML), Java, JavaScript, and the like.

Client device 108 can be any electronic device incorporating input device 102 and/or display screen 103, such as a desktop computer, laptop computer, personal digital assistant (PDA), cellular telephone, smartphone, music player, handheld computer, tablet computer, kiosk, game system, wearable device, or the like. Any suitable type of communications network 109, such as the Internet, can be used as the mechanism for transmitting data between client device 108 and server 110, according to any suitable protocols and techniques. In addition to the Internet, other examples include cellular telephone networks, EDGE, 3G, 4G, 5G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 108 transmits requests for data via communications network 109, and receives responses from server 110 containing the requested data. Such requests may be sent via HTTP as remote procedure calls or the like.

In one implementation, server 110 is responsible for data storage and processing, and incorporates data store 106. Server 110 may include additional components as needed for retrieving data from data store 106 in response to requests from client device 108.

As also set forth in FIG. 1, data store 106 may be organized into one or more well-ordered data sets, with one or more data entries in each set. Data store 106, however, can have any suitable structure, and may store data according to any organization system known in the information storage arts, such as databases and other suitable data storage structures. As in FIG. 1, data store 106 may store data depicting cost models for compression algorithms, and/or other information that may be used in performing the methods described herein; alternatively, such data can be stored elsewhere (such as at another server) and retrieved as needed.

In addition to or in the alternative to the foregoing, data may also be stored in a data store 106 present in client device 108. In some embodiments, such data may include elements distributed between server 110 and client device 108 and/or other computing devices in order to facilitate secure and/or effective communication between these computing devices.

As also set forth in FIG. 1, display screen 103 can be any element that displays information such as text and/or graphical elements. Various user interface elements, dynamic controls, and/or the like may be used in connection with display screen 103.

As also set forth in FIG. 1, processor 104 can be a conventional microprocessor for use in an electronic device to perform operations on data under the direction of software, according to well-known techniques. Memory 105 can be random-access memory, having a structure and architecture as are known in the art, for use by processor 104 in the course of running software. A communication device 107 may communicate with other computing devices through the use of any known wired and/or wireless protocol(s), as also set forth in the description of FIG. 1.

In one embodiment, some or all of the system can be implemented as software written in any suitable computer programming language, whether in a standalone or client/server architecture. Alternatively, it may be implemented and/or embedded in hardware.

Notably, multiple servers 110 and/or multiple client devices 108 may be networked together, and each may have a structure similar to those of client device 108 and server 110 that are illustrated in FIG. 2. The data structures and/or computing instructions used in the performance of methods described herein may be distributed among any number of client devices 108 and/or servers 110. As used herein, "system" may refer to any of the components, or any collection of components, from FIGS. 1 and/or 2, and may include additional components not specifically described in connection with FIGS. 1 and 2.

In some embodiments, data within data store 106 may be distributed among multiple physical servers. Thus, data store 106 may represent one or more physical storage locations, which may communicate with each other via the communications network and/or one or more other networks (not shown). In addition, server 110 as depicted in FIG. 2 may represent one or more physical servers, which may communicate with each other via communications network 109 and/or one or more other networks (not shown).

In one embodiment, some or all components of the system can be implemented in software written in any suitable computer programming language, whether in a standalone or client/server architecture. Alternatively, some or all components may be implemented and/or embedded in hardware.

In at least one embodiment, the techniques described herein can be combined with the techniques described in the related applications cross-referenced above, for example to unwind program call stacks across native-to-interpreted code boundaries during performance profiling.

Software Architecture and Method

Figure 3:
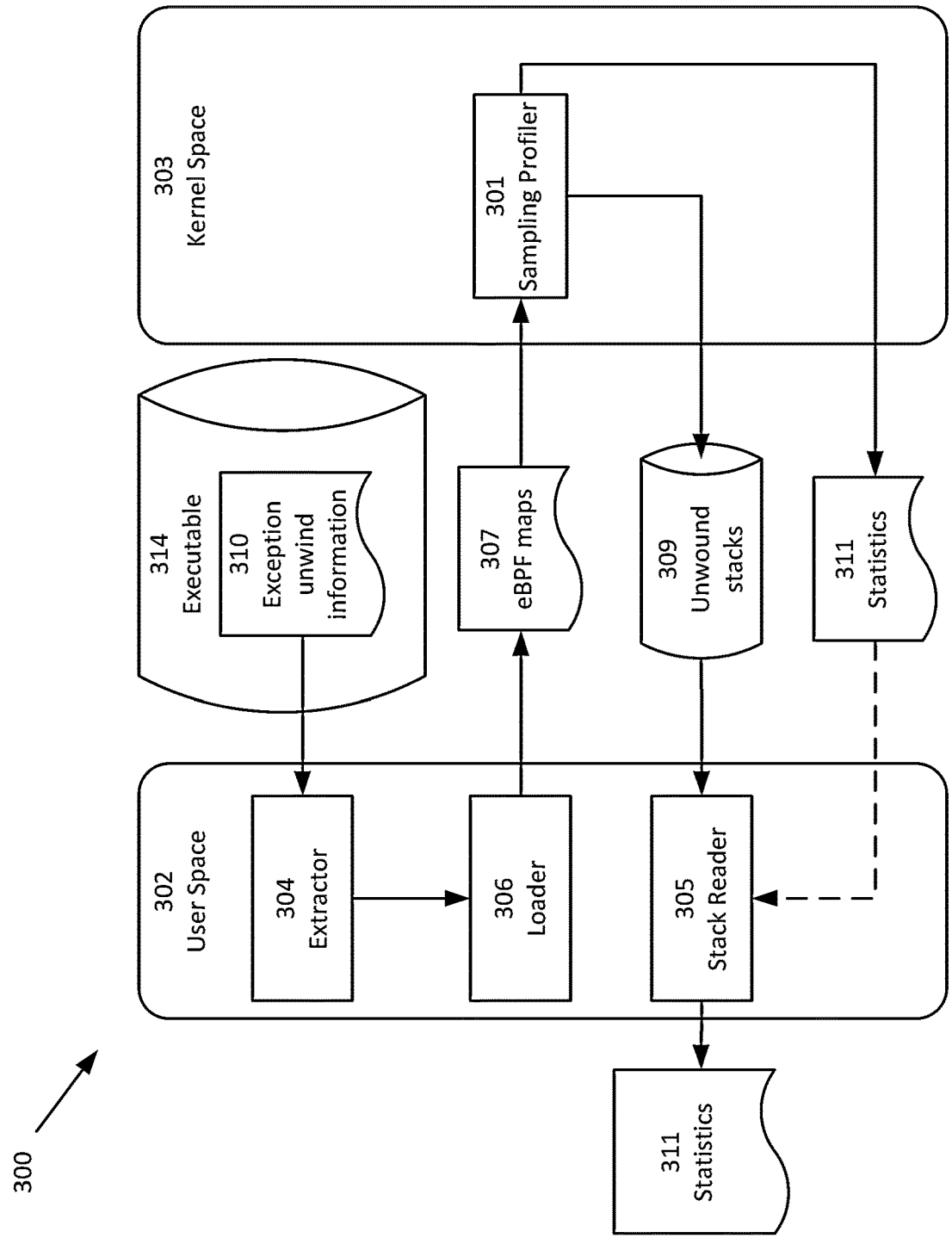
FIG. 3 is a block diagram depicting a software architecture for implementing the techniques described herein according to one embodiment.

Referring now to FIG. 3, there is shown a block diagram depicting a software architecture 300 for implementing the techniques described herein according to one embodiment.

In various embodiments, the software components and functional modules shown in FIG. 3 can be implemented using any suitable hardware architecture, including, for example, the hardware architectures depicted in FIGS. 1 and 2. In various embodiments, the software components and functional modules can reside on the same physical machine or may be distributed among any number of interconnected machines. In addition, these software components and functional modules may be implemented within the same software program or may be distributed among different software programs.

In the architecture shown in FIG. 3, four functional modules are shown: extractor 304, stack reader 305, loader 306, and sampling profiler 301. In the example, extractor 304, stack reader 305, and loader 306 are shown as running within user space 302, while sampling profiler 301 is shown as running within kernel space 303. However, one skilled in the art will recognize that other arrangements are possible, wherein the various depicted modules can run in different physical and/or logical spaces than those depicted in FIG. 3.

In at least one embodiment, user space 302 and kernel space 303 can be associated with the same hardware device, such as client 108 or server 110. However, such associations between logical spaces and hardware components are merely exemplary of one embodiment.

Figure 4:
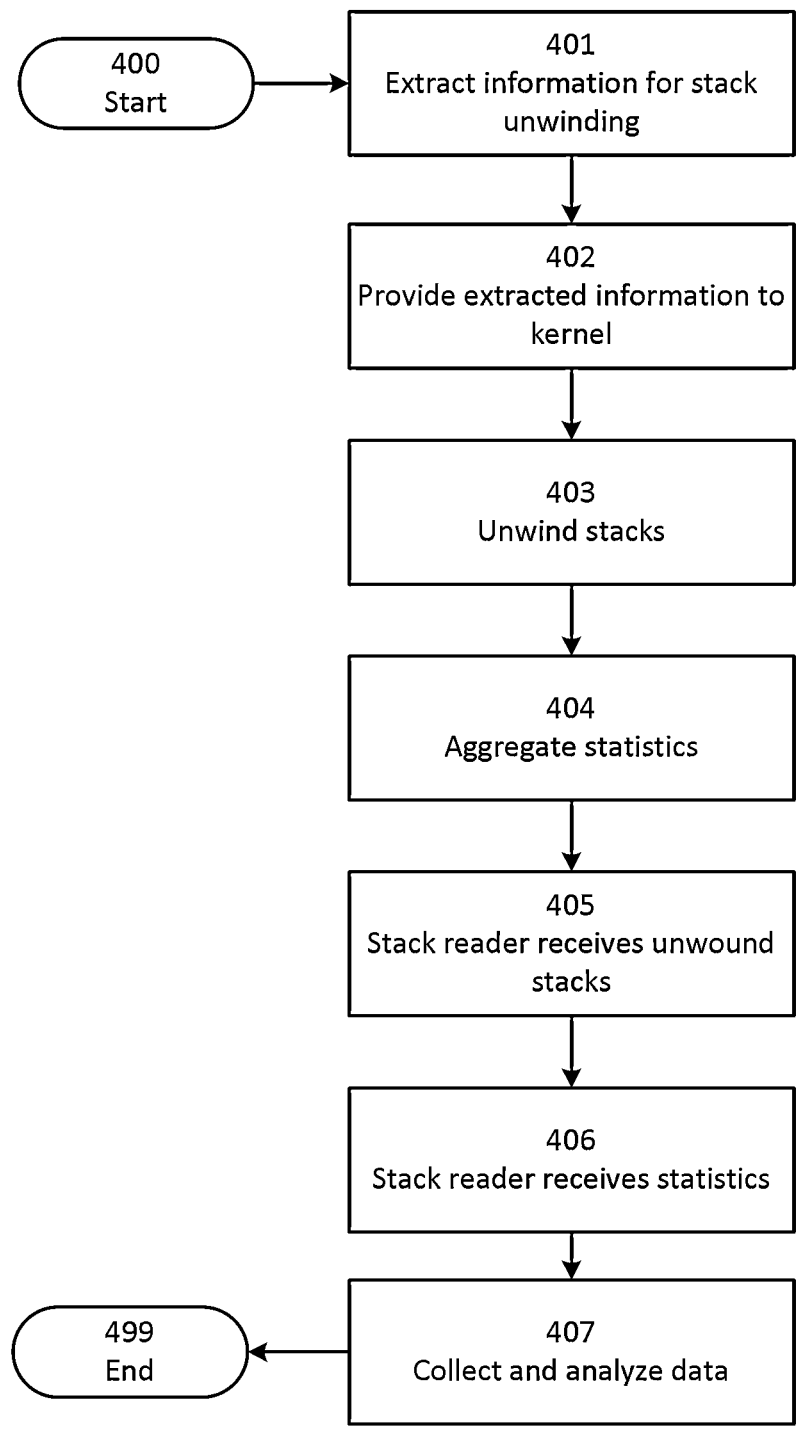
FIG. 4 is a flow diagram depicting a method for implementing the techniques described herein according to one embodiment.

Referring now also to FIG. 4, there is shown a flow diagram depicting a method for implementing the techniques described herein according to one embodiment. In at least one embodiment, the steps shown in FIG. 4 may be performed by functional modules such as those shown in FIG. 3, and may be implemented using a hardware architecture such as those shown in FIG. 1 or FIG. 2. One skilled in the art will recognize, however, that the method of FIG. 4 may be performed using other hardware architectures and functional architectures.

The method begins 400. Extractor 304, which may run in user space 302, extracts 401 information for stack unwinding from exception unwind information 310 (originally designed for C++ exception handling). Such exception unwind information 310 may come from any suitable source, such as for example from executable 314.

Loader 306 then provides 402 the extracted information to kernel 303 by loading it into eBPF maps 307, which are particular areas of memory designed to allow user space applications (such as modules 304, 305, and 306) to interface with kernel space components (such as sampling profiler 301). Alternatively, the data can be shared with components within kernel space 303 using any memory region that both kernel space 303 and user space 302 can access.

Sampling profiler 301, which may run in kernel space 303, uses the data provided by loader 306 to unwind 403 (i.e. construct) stacks within executable 314, and to aggregate 404 statistics 311 about particular stack traces. In various embodiments, statistics may be aggregated in either user space 302, kernel space 303, or some combination thereof. In at least one embodiment, sampling profiler 301 may run at regular intervals, or may be triggered (for example) by a timer interrupt or other suitable mechanism.

In at least one embodiment, stack reader 305, which may run in user space 302, receives 405 unwound stacks 309 (and optionally receives 406 statistics 311) and processes them for collection and statistical analysis 407. In at least one embodiment, sampling profiler 301 may run locally within kernel space 303.

Alternatively, a component running locally within kernel space 303 may send unwound stacks 309 (and optional receives 406 statistics 311) to a remote server, such as one of servers 110, along with a timestamp; the information may be processed at server 110 for collection and statistical analysis.

Each of these components, and their functionality, will be described below.

Extractor 304

As mentioned above, extractor 304 extracts exception unwind information 310, which in at least one embodiment may come from executable 314.

Executable files are usually stripped of their debug information. However, in modern Linux environments, a particular section containing frame information is often retained (".eh_frame"). The purpose of this frame is to allow C++ exception handling, which needs to unwind the stack of the program in a situation where an exception is thrown. This section is usually provided in a standardized debugging data format such as DWARF, and can be read as such. In general such a format is reasonably compact, but may require a complex state machine to properly interpret.

In at least one embodiment, the described system repurposes this data to perform profiling.

As described above, in step 401, extractor 304 extracts exception unwind information 310 from executable 314; such information 310 may include. This information may come from, for example, the ".eh_frame" section of executable 314. Once extracted, information 310 can be stored in any suitable location, such as for example, memory 105, data store 106 (whether local or at remote server 110), or the like, for further processing.

In cases where an ".eh_frame" section is not available within executable 314, or is corrupt or incorrect, the relevant information can also be directly recovered by disassembly of executable 314 (at potentially higher computational cost). Any of a number of well-known methods can be used to perform such recovery and extraction. For example, the binary executable can be scanned for elements that resemble entry points, and a recursive descent disassembly of the binary executable can be performed.

The information needed for stack unwinds can thus be recovered by, for example:
- Disassembling the instructions;
- Recovering some approximation of the control flow of the individual functions in the executable; and
- Statically analyzing the position of the stack pointer with regard to the saved return address on the stack, so that for each address in the executable, the system is able to determine where, in relation to a CPU register, the current return address is stored.

In at least one embodiment, extractor 304 operates by examining executable 314, including executable files and libraries currently loaded in memory, and then either extracts the relevant information locally, or requests previously extracted and compacted maps from a remote server for each library and executable 314 in question.

Compact Data Structures for Exception Unwind Information 310

Any suitable data structure can be used for representing exception unwind information 310 in memory 105 or data store 106. In at least one embodiment, a data structure is used that is capable of mapping each relevant address within executable 314 to a stack delta, which is a constant value that helps sampling profiler 301 find the address of the next stack frame.

More specifically, the stack delta indicates the offset to add to or subtract from an address in a CPU register or fixed memory location to find the corresponding stack frame within the stack. Executable 314 has a number of addresses, which may refer to the location of various instructions or the like. Each of the addresses within executable 314 can be characterized by a stack delta. This association of each address with a stack delta can be referred to as an address-to-delta mapping.

When naively implemented, the address-to-delta mapping can be prohibitively large. Accordingly, in at least one embodiment, a specialized, compact data structure is used, along with additional pre-processing to minimize memory consumption.

Figure 5:
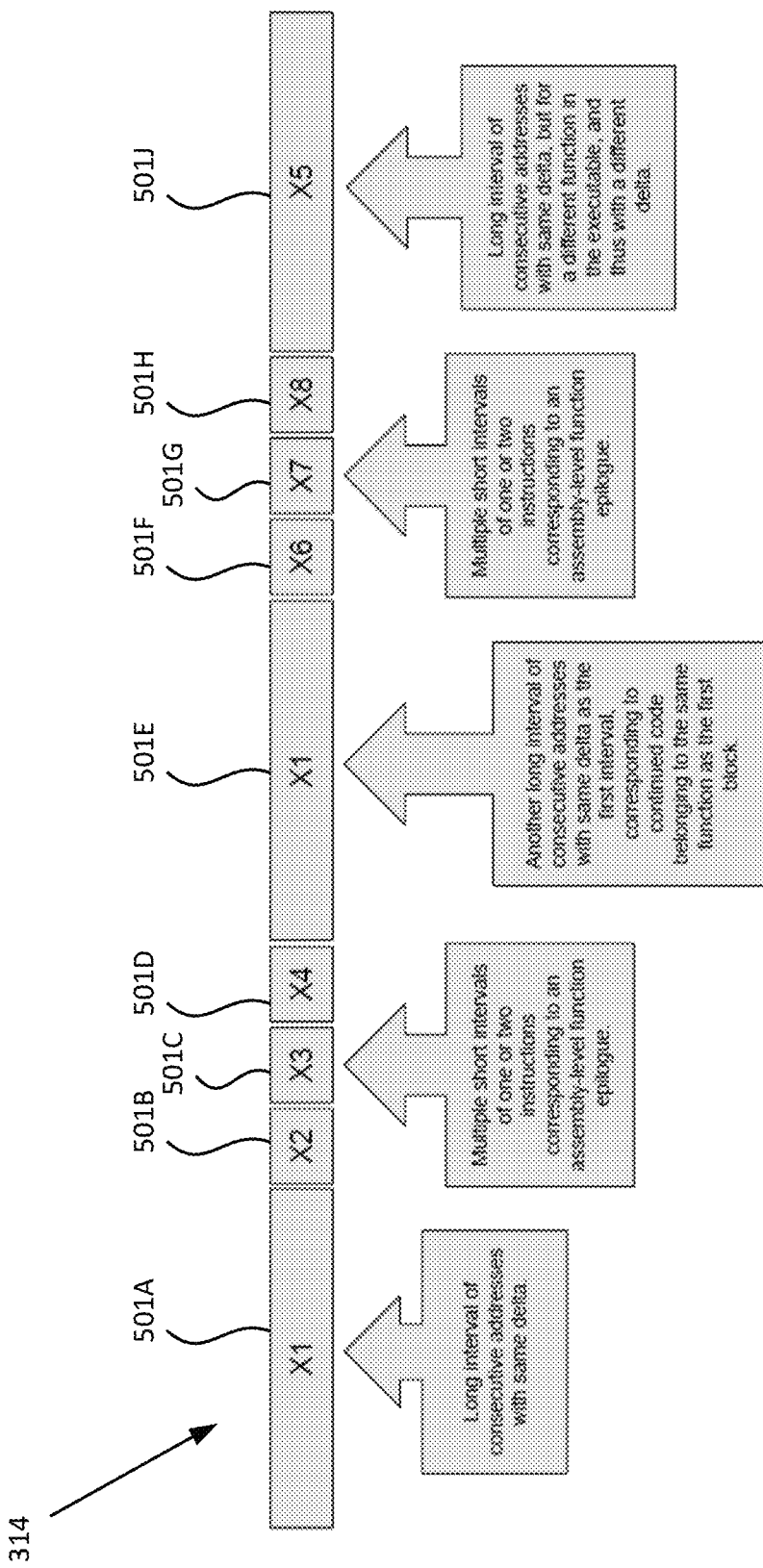
FIG. 5 depicts an example of an executable including intervals of consecutive addresses and their mappings, according to one embodiment.

For example, in at least one embodiment, a data structure can be used that exploits a pattern and thereby provides for a more compact representation. Referring now to FIG. 5, there is shown example of an executable 314 (or portion thereof).

In FIG. 5, individual addresses are not shown; rather a series of intervals 501A through 501J are shown. Each such interval 501 represents a number of consecutive addresses having the same stack delta. Thus, all addresses within a particular interval 501 have the same address-to-delta mapping.

Examining the address-to-delta mappings and joining adjacent addresses with identical deltas into longer intervals 501, a pattern becomes visible. This pattern arises from the fact that code blocks belonging to the same function tend to be arranged consecutively within executable 314. Most code blocks belonging to the same function have the same stack delta, with the exception of small intervals belonging to either function epilogues or areas of the code where arguments to sub-functions are temporarily placed on the stack.

As can be seen in the example of FIG. 5, a particular function can therefore include multiple longer intervals 501 such as intervals 501A, 501E, and 501J, interrupted by short bursts of smaller intervals 501 such as intervals 501B, 501C, 501D, 501F, 501G, 501H. In the example of FIG. 5, intervals 501A and 501E share the same delta (X1), indicating that they correspond to continued code belonging to the same function, even though such code is interrupted by shorter intervals 501B, 501C, and 501D. In the example, interval 501J is another long interval 501 that has a different delta (X5) than that of intervals 501A and 501E, since it may correspond to a different function than is represented by intervals 501A and 501E. Shorter intervals 501F, 501G, and 501H appear between longer intervals 501E and 501J.

In this example, shorter intervals 501B, 501C, 501D, 501F, 501G, and 501H may each represent one or two instructions corresponding to an assembly-level function epilogue or the like. All have different deltas than one another.

Figure 6:
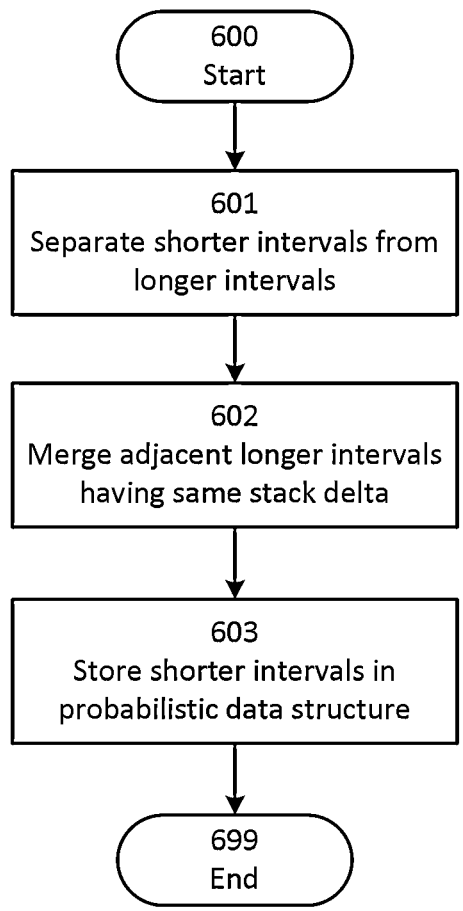
FIG. 6 is a flow diagram depicting a method for processing, merging, and separating intervals according to one embodiment.
Figure 7:
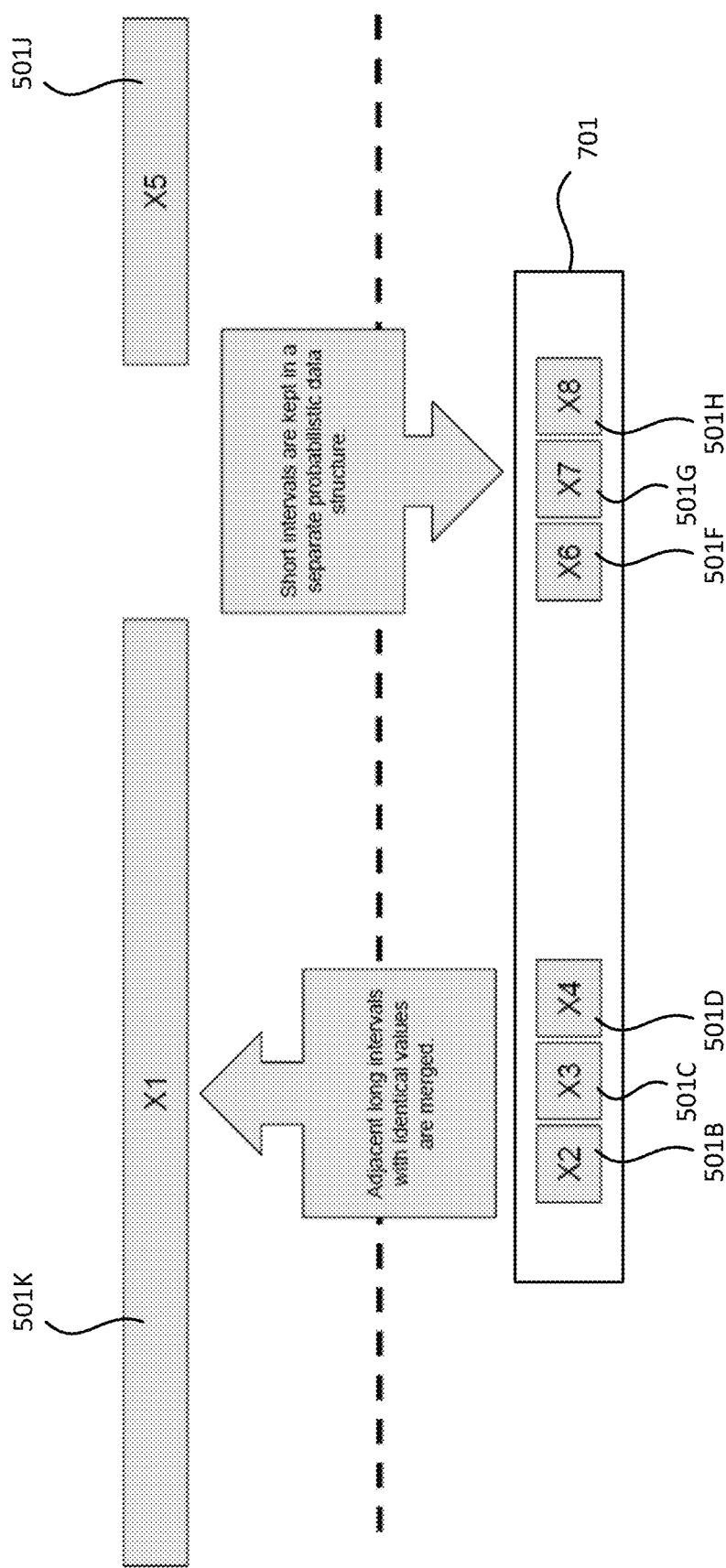
FIG. 7 depicts an example of an application of the method of FIG. 6 to the executable shown in FIG. 5.

Referring now to FIG. 6, there is shown a flow diagram depicting a method for processing, merging, and separating intervals according to one embodiment, to more efficiently extract and store information 401 from executable 314. The method shown in FIG. 6 exploits the pattern exemplified by FIG. 5. Referring also to FIG. 7, there is shown an example of an application of the method of FIG. 6 to the executable shown in FIG. 5.

First, extractor 304 separates 601 the shorter intervals 501 (such as intervals 501B, 501C, 501D, 501F, 501G, and 501H) from the longer intervals 501 (such as intervals 501A, 501E, and 501J), for example by applying a comparison with a threshold interval length.

Extractor 304 then merges 602 adjacent longer intervals 501 having the same stack delta with one another. This significantly reduces the number of total intervals to track. In the example of FIG. 7, interval 501K represents the merger of intervals 501A and 501E, since those share the same stack delta (X1).

Extractor 304 then stores 603 shorter intervals 501 (which may represent single addresses or smaller sets of addresses) and their corresponding stack deltas. In at least one embodiment, such shorter intervals 501 are stored in probabilistic data structure 701 (such as one or more Bloom maps, combinations of Bloom filters and Matrix filters, Golomb-Coded Sets, and/or any other probabilistic data structure or structures that allow(s) set-membership testing with one-sided false positive error and value lookup). This greatly reduces memory consumption of the overall map.

The method then ends 699.

In at least one embodiment, when unwinding stacks 403, sampling profiler 301 uses the data stored by extractor 304 to determine the stack delta for a given input address, as follows:
- First, sampling profiler 301 translates the input address (which may be a virtual address, and thus different for every invocation of the program on modern systems due to a technique called "address space layout randomization") into an address inside the backing code section (which is always the same for a given executable 314).
- Sampling profiler 301 then performs a lookup into probabilistic data structure 701 for the single-address intervals, to check whether the address in question is a single-address interval. If so, the associated value is returned. Otherwise, a bsearch function into the sorted set of merged intervals for executable 314 is performed, and the relevant value is returned.

Loader 306

Once the data for all currently relevant executables and libraries has been collected, and after the data is (optionally) compacted using the techniques described above in connection with FIGS. 6, loader 306 provides 402 the extracted information to sampling profiler 301, which may be implemented in kernel space 303. In at least one embodiment, loader 306 provides 402 this information via eBPF maps 307. The use of eBPF maps 307 facilitates fast stack delta lookup on the compact data structures generated by extractor 304.

Sampling Profiler 301

In at least one embodiment, sampling profiler 301 runs within kernel space 303. It may be implemented as an eBPF program or as a regular kernel module. One advantage of using an eBPF program is that the eBPF infrastructure has been designed to ensure safety and stability of systems running arbitrary eBPF programs.

In at least one embodiment, sampling profiler 301 is executed periodically by the kernel, either at given time intervals (N times per second) or in response to specific trigger events (such as transmission of a network packet, file open, and/or the like). In at least one embodiment, sampling profiler 301 performs the following tasks:

- Sampling profiler 301 uses the stack delta information provided by extractor 304 and loader 306 (e.g. via eBPF maps 307), and repeatedly runs the lookup process described above in order to unwind the stack of the currently executing thread.
- During stack unwinding, sampling profiler 301 optionally also identifies whether it is currently unwinding interpreted code. In at least one embodiment, sampling profiler 301 can provide cross-language profiling, including profiling across boundaries between native code and interpreted code. Such techniques are described in further detail in the above-referenced related application.
- In at least one embodiment, when the stack has been unwound to a sufficient depth, sampling profiler 301 calculates a fingerprint over the entire frame, and checks whether the frame has already been seen before.
    If the frame has not been seen before, sampling profiler 301 stores both the stack frame and the associated fingerprint in a data structure for communication to user space 302 components. This data structure is shown in FIG. 3 as unwound stacks 309. In at least one embodiment, sampling profiler 301 also increments a counter in a data structure to hold counter values for fingerprints to indicate that the frame has now been seen at least once.
    If the frame has been seen before, the kernel mode component increments the associated counter.
- In at least one embodiment, the counters in question are periodically read by stack reader 305 as described below.
- In at least one embodiment, sampling profiler 301 also generates aggregate statistics 311 to be further processed by stack reader 305. Such statistics can include, for example, an indication as to the number of times each particular stack trace has been observed. In at least one embodiment, aggregate statistics 311 are provided via an eBPF map or by any other suitable means.

Stack Reader 305

In at least one embodiment, stack reader 305 is a user space component that collects aggregate statistics 311 generated by sampling profiler 301, adds metadata helpful for later analysis to them, and then transmits these aggregate statistics 311 to a centralized infrastructure (not shown) that can perform analytics. Such centralized infrastructure can be implemented, for example, on a server 110 or other suitable component. In at least one embodiment, aggregate statistics 311 are provided via an eBPF map.

Advantages

The described system provides several advantages over previous systems. In particular, the described system can be implemented for operation on fully-optimized executables, so that developers do not have to trade off execution speed for the ability to unwind. In addition, the described system does not require the availability or processing of traditional debug information, and does not incur the difficulties and performance hit of dumping entire sections of the stack to be post-processed by user space code.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Wash.; MacOS, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A computer-implemented method for performance profiling, comprising:
    at a processor, obtaining executable code;
    at the processor, extracting, from the executable code, frame information comprising exception stack unwinding information;
    at the processor, compacting the extracted frame information by:
        determining stack deltas for a plurality of addresses associated with the executable code;
        defining a plurality of intervals, wherein each interval comprises a plurality of consecutive addresses having the same stack delta;
        classifying each interval as a short interval or a long interval, based on a threshold interval length;
        responsive to at least two consecutive long intervals having a common stack delta, merging the at least two consecutive long intervals; and
        generating a compact representation of the extracted frame information comprising the short intervals and the merged long intervals;
    at a storage device, storing the compact extracted frame information;
    at the processor, using the stored compact frame information, including the exception stack unwinding information, to unwind a program stack during execution of the executable code;
    at the processor, profiling the unwound program stack; and
    at an output device, outputting the results of the profiling.

2. The method of claim 1, wherein storing the compact extracted frame information comprises storing the short intervals in a probabilistic data structure.

3. The method of claim 1, wherein using the stored frame information to unwind the program stack comprises transferring the stored frame information from a user space to a kernel space via at least one eBPF map.

4. The method of claim 1, wherein profiling the unwound program stack comprises generating statistics as to the occurrence of frames of executable code.

5. The method of claim 1, wherein the executable code lacks frame pointers.

6. A non-transitory computer-readable medium for performance profiling, comprising instructions stored thereon, that when performed by a hardware processor, perform the steps of:
    obtaining executable code;
    extracting, from the executable code, frame information comprising exception stack unwinding information;
    compacting the extracted frame information by:
        determining stack deltas for a plurality of addresses associated with the executable code;

defining a plurality of intervals, wherein each interval comprises a plurality of consecutive addresses having the same stack delta;

classifying each interval as a short interval or a long interval, based on a threshold interval length;

responsive to at least two consecutive long intervals having a common stack delta, merging the at least two consecutive long intervals; and generating a compact representation of the extracted frame information comprising the short intervals and the merged long intervals;

causing a storage device to store the compact extracted frame information;

using the stored compact frame information, including the exception stack unwinding information, to unwind a program stack during execution of the executable code;

profiling the unwound program stack; and causing an output device to output the results of the profiling.

7. The non-transitory computer-readable medium of claim 6, wherein causing the storage device to store the compact extracted frame information comprises causing the storage device to store the short intervals in a probabilistic data structure.

8. The non-transitory computer-readable medium of claim 6, wherein using the stored frame information to unwind the program stack comprises transferring the stored frame information from a user space to a kernel space via at least one eBPF map.

9. The non-transitory computer-readable medium of claim 6, wherein profiling the unwound program stack comprises generating statistics as to the occurrence of frames of executable code.

10. The non-transitory computer-readable medium of claim 6, wherein the executable code lacks frame pointers.

11. A system for performance profiling, comprising:
  a processor, configured to:
    obtain executable code;
    extract, from the executable code, frame information comprising exception stack unwinding information; and
    compact the extracted frame information by:
      determining stack deltas for a plurality of addresses associated with the executable code;
      defining a plurality of intervals, wherein each interval comprises a plurality of consecutive addresses having the same stack delta;
      classifying each interval as a short interval or a long interval, based on a threshold interval length;
      responsive to at least two consecutive long intervals having a common stack delta, merging the at least two consecutive long intervals; and
      generating a compact representation of the extracted frame information comprising the short interval sand the merged long intervals;
  a storage device, communicatively coupled to the processor, configured to store the compact extracted frame information; and
  an output device, communicatively coupled to the processor;
  wherein:
    the processor if further configured to:
      use the stored frame information, including the exception stack unwinding information, to unwind a program stack during execution of the executable code; and
    the output device is configured to output the results of the profiling.

12. The system of claim 11, wherein storing the compact extracted frame information comprises storing the short intervals in a probabilistic data structure.

13. The system of claim 11, wherein using the stored frame information to unwind the program stack comprises transferring the stored frame information from a user space to a kernel space via at least one eBPF map.

14. The system of claim 11, wherein profiling the unwound program stack comprises generating statistics as to the occurrence of frames of executable code.

15. The system of claim 11, wherein the executable code lacks frame pointers.

* * * * *